(12) United States Patent
Liu et al.

(10) Patent No.: US 11,354,045 B2
(45) Date of Patent: Jun. 7, 2022

(54) STORAGE DEVICE SYSTEM PERFORMANCE MANAGEMENT

(71) Applicant: Seagate Technology LLC, Fremont, CA (US)

(72) Inventors: Xiong Liu, Singapore (SG); WenXiang Xie, Singapore (SG); Jian Qiang, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/943,898

(22) Filed: Jul. 30, 2020

(65) Prior Publication Data

US 2022/0035536 A1 Feb. 3, 2022

(51) Int. Cl.
*G06F 3/06* (2006.01)
*G11B 5/596* (2006.01)

(52) U.S. Cl.
CPC .......... *G06F 3/0617* (2013.01); *G06F 3/0659* (2013.01); *G06F 3/0689* (2013.01); *G11B 5/59627* (2013.01)

(58) Field of Classification Search
CPC ...... G06F 3/061; G06F 3/0611; G06F 3/0617; G06F 3/0659; G06F 3/0655; G06F 3/0689; G06F 3/0628
See application file for complete search history.

(56) References Cited

U.S. PATENT DOCUMENTS

| | | | |
|---|---|---|---|
| 9,236,087 B1 * | 1/2016 | Dahlberg | ........... G11B 5/59688 |
| 2018/0260159 A1 | 9/2018 | Hall | |
| 2018/0322902 A1 | 11/2018 | Qiang et al. | |
| 2019/0279672 A1 | 9/2019 | Yoshikawa | |
| 2020/0090705 A1 | 3/2020 | Qiang et al. | |

\* cited by examiner

*Primary Examiner* — Tracy A Warren
(74) *Attorney, Agent, or Firm* — Holzer Patel Drennan

(57) ABSTRACT

The technology disclosed herein pertains to a method for determining expected command completion time (CCT), the method including receiving a plurality of position error signals (PESs) for an HDD over a predetermined time period, determining sigma of the plurality of PESs, retrieving upper off-track limits (UOL) for one or more data sectors of the HDD, calculating average number of retrieved sectors (A) between two consecutive occurrences of the |PES|>UOL for the HDD, and determining required number of revolutions (CCT) to collect data based on the average number of retrieved data sectors (A) and a total number of requested data sectors (N).

20 Claims, 5 Drawing Sheets

STORAGE DEVICE SYSTEM PERFORMANCE MANAGEMENT

BACKGROUND

Hard disc drives (HDDs) are widely used for storage of large quantities of data. For example, HDD based storage systems may be used for storing data for network attached storage (NAS) applications, surveillance applications, cloud data storage applications, etc. Often systems using HDDs use data redundancy to ensure integrity of data. For example, one type of NAS system using HDDs is redundant array of independent disks (RAIDs) where several HDDs are made into one logical disk. Alternatively, a cloud system configured using HDD may have multiple copies of the same data held in multiple separate places on the cloud. As a result, these systems provide alternative options to retrieve same piece of data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a method for determining expected command completion time (CCT), the method including receiving a plurality of position error signals (PESs) for an HDD over a predetermined time period, determining sigma of the plurality of PESs, retrieving upper off-track limits (UOL) for one or more data sectors of the HDD, calculating average number of retrieved sectors (A) between two consecutive occurrences of the |PES|>UOL for the HDD, and determining required number of revolutions (CCT) to collect data based on the average number of retrieved data sectors (A) and a total number of requested data sectors (N).

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Hard disc drives (HDDs) are widely used for storage of large quantities of data. For example, HDD based storage systems may be used for storing data for network attached storage (NAS) applications, surveillance applications, cloud data storage applications, etc. Often systems using HDDs use data redundancy to ensure integrity of data. For example, one type of NAS system using HDDs is redundant array of independent disks (RAIDs) where several HDDs are made into one logical disk. Alternatively, a cloud system configured using HDD may have multiple copies of the same data held in multiple separate places on the cloud. As a result, these systems provide alternative options to retrieve same piece of data.

Implementations described herein provide a method for boosting system performance based on CCT received from a HDD. In one implementation, the HDD provides the estimated CCT to the host. A storage system controller associated with the host may compare the estimated CCT with a threshold to determine of the CCTs are high. In response to determining that the CCTs are higher than the threshold, the host may implement alternate data requests to the storage device including the CCT. For example, the host may send a data request to a mirrored HDD when the storage device is a RAID 1 system. If the storage device is a RAID 5, the host may get the data from another HDD of the storage device through calculation for RAID 5 with three other HDDs from the storage device. Alternatively, if the storage device is a cloud system with multiple redundant copies of the data, the host may get the data from such other redundant data source.

Figure 1:
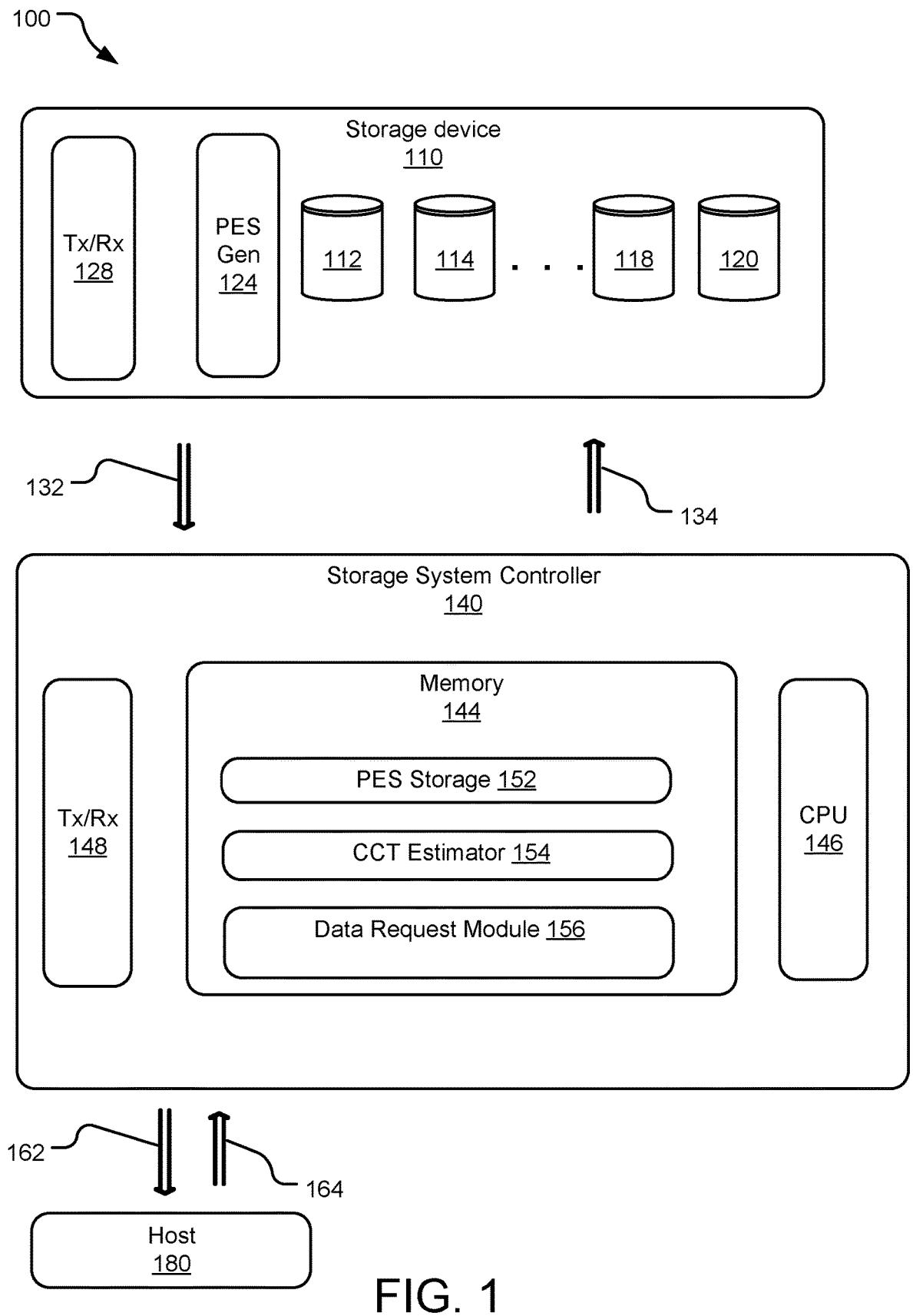
FIG. 1 illustrates an example block diagram of a system to boost performance based on determining expected command completion time (CCT).

FIG. 1 illustrates a block diagram of a system 100 to boost performance based on determining expected command completion time (CCT). The system 100 includes a storage device 110 that may be used by a host 180. The host 180 may also include or communicate via a storage system controller 140 with the storage device 110. The storage device 110 may be a RAID system that includes a number of HDDs 112-120. Alternatively, the storage device 110 may be a cloud system with the number of HDDs 112-120.

In one implementation, the storage device 110 also includes a position error signal (PES) generator 124 that receives PESs of the various HDDs 112-120 over a predetermined time period. In one implementation, the PES generator 124 may generate the PES from embedded servo data of each of the HDDs 112-120. A transceiver 128 may communicate the PES to the storage system controller 140 as illustrated by 132. The storage system controller 140 may also include a transceiver 148 that communicates with the storage device 110 as well as with the host 180. In one implementation, the storage system controller 140 may be configured as part of the host 180.

A memory 144 of the storage system controller 140 may be configured to store instructions for various software modules that may be executed on a CPU 146 as well as one or more databases for storing various data. For example, a PES storage 152 may store the PES data for the various HDDs. A CCT estimator module 154 may analyze the PES data stored in the PES storage 152 and generated estimated CCTs for completing commands. In one implementation, the estimated CCTs may provide the required number of revolutions for completing commands.

Specifically, the CCT estimator 154 may generate an estimate of the required number of revolutions for a given HDD by first calculating a sigma of the PESs for the given HDD. In one implementation, the sigma of the PESs is generated by taking the PES values over a predetermined time period, such as one minute. As long as the given HDD is on track, PES is continuously generated and used by HDD to control the actuator (head) on the track. For example, such sigma of the PES may vary from 2% of the track pitch (TP) to 25% of the TP—with PES sigma being 2% of TP indicating a normal condition for the HDD whereas the higher PES sigma values indicating erroneous or extraneous conditions for HDD operation.

Once the PES sigma is determined, the CCT estimator 154 may calculate the probability of the absolute value of the PES being above an upper off-track limit (UOL). For example, the UOL may be determined by an off-track reading operation during factory certification process. Such UOL may represent the off-track capability of a given HDD design and is part of design margin. In one implementation, the UOL is determined to be, say 15%. However, the UOL may be determined to be at one or more other percentage levels, with higher UOL indicating higher PES tolerance levels, higher design margin, or better performance. In one implementation, the probability P of |PES| being greater than UOL may be given as follows:

$$P(|PES|>UOL)=2\times(1-\Phi(UOL/S))$$

Here S is the sigma of the PES.

Subsequently, the CCT estimator may determine an average number of retrieved data sectors, represented by A, as follows:

$$A=(\ln(CL)/\ln(P(|PES|>UOL)*DS/SW$$

Here CL is a desired confidence level, DS is the number of data sectors and SW is the number of servo wedges for the given track of the HDD. The SW may be same from an outer diameter (OD) to an inner diameter (ID) of an HDD. For example, in one implementation, the CL may be 50% and each of the DS and SW may be 500. It is assumed here that the entire track is read.

After determining the average number of retrieved data sectors A, the required number of revolutions REVS to retrieve all the data from a track can be given as follows:

$$REVS=\ln((1-CL)/N)/\ln(1/(A+1))$$

Wherein N is the total number of requested sectors.

Once the REVS is determined, the value of the REVS is passed on to the host as indicated by 162. The host 180 may compare the REVS to a threshold value and determine if it is necessary to get the data from the storage device 110 using an alternative method. For example, if the REVS for HDD 114 is above a threshold indicating high delay in getting the data from the HDD 114, the host 180 may determine that it is necessary to get data from other HDDs. The host communicates its request for getting data from an alternative HDD to the storage system controller 140, as indicated by 164. In response, a data request module 156 of the storage system controller formulates a data request to the storage device 110 according to the instructions from the host 180. For example, if the storage device 110 is a RAID 1 system, the data request module 156 may request data from an HDD that stored mirrored data to the HDD 114, as indicated by 134. Alternatively, if the storage device 110 is a RAID 5 storage, the data request module 156 may request data from other two HDDs and use RAID 5 calculation to get the data.

Figure 2:
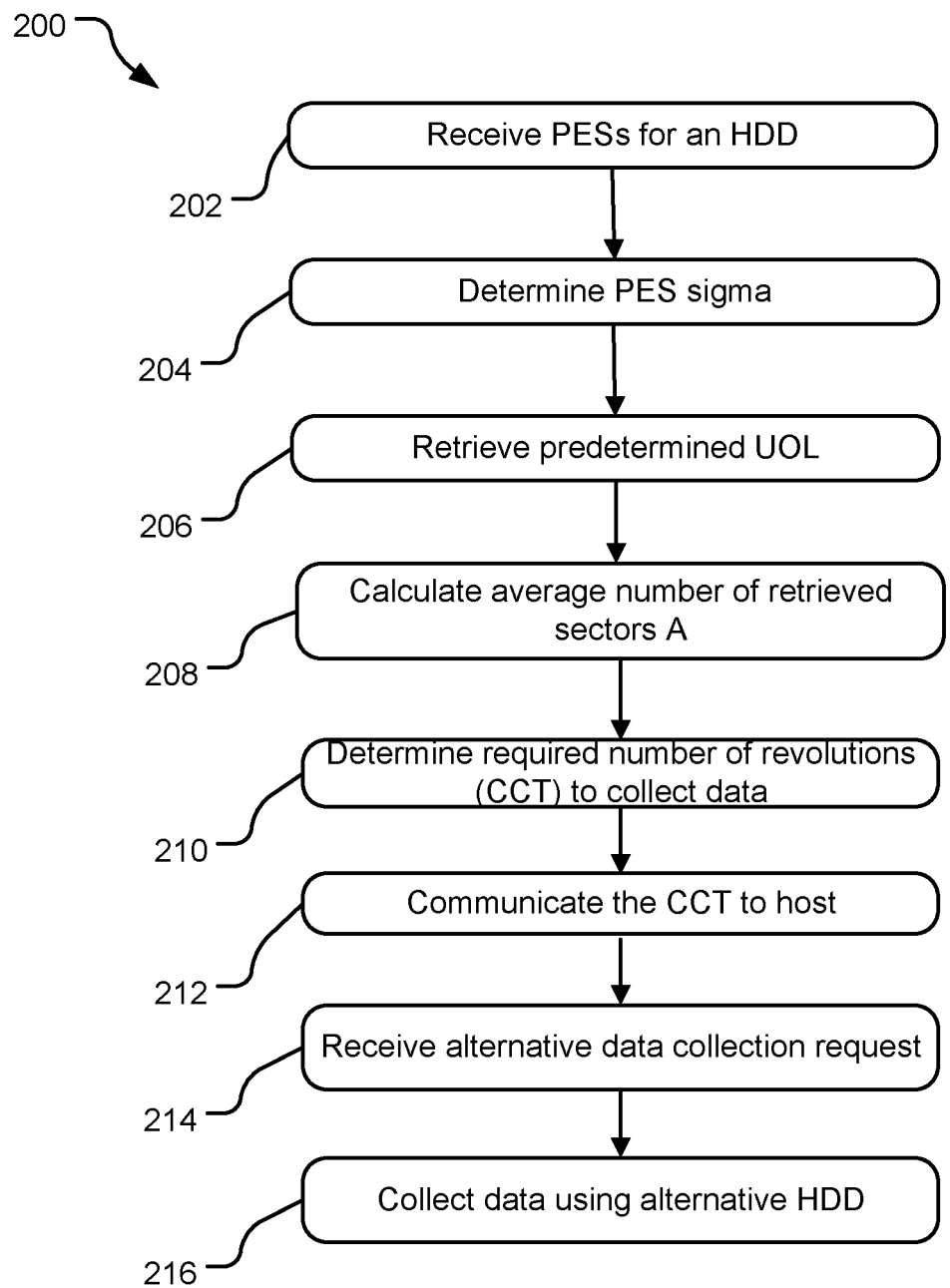
FIG. 2 illustrates example operations for boosting system performance based on determination of expected CCT.

FIG. 2 illustrates operations 200 for boosting system performance based on determination of expected CCT. An operation 202 receives various PESs for one or more HDDs of a storage device. For example, PESs for each HDD of a RAID may communicated at operation 202. In one implementation, the PESs for the various HDDs may be generated from embedded servo data. The PESs for the HDDs may be stored in a PES storage data structure. An operation 204 determines PES sigma over a predetermined time period. For example, PES sigma may be calculated over a period of last thirty (30) minutes of PESs, last day of PESs, etc.

An operation 206 retrieves the predetermined upper off-track limit (UOL) for each HDD. In an alternative implementation, the UOL value may be predetermined for each head of an HDD. Yet alternatively, the UOL may be predetermined for each data zone such as outer diameter (OD) zone, inner diameter (ID) zone, and middle diameter (MD) zone for each head of the HDD. For example, the UOL may be determined as percentage of track pitch (TP) of the HDD. In one implementation, the UOL is determined during the HDD certification process.

Subsequently, an operation 208 calculates an average number of retrieved data sectors (A) between two consecutive occurrences of |PES|>UOL. Specifically, the operation 208 determines the value of A using the following equation:

$$A=(\ln(CL)/\ln(P(|PES|>UOL)*DS/SW$$

Here CL is a desired confidence level, DS is the number of data sectors and SW is the number of servo wedges for the given track of the HDD. For example, in one implementation, the CL may be 50% and each of the DS and SW may be 500. It is assumed here that the entire track is read.

An operation 210 calculates the command completion time (CCT) in the form of the required number of revolutions (REVS) to retrieve all data according to a data request from a host for a given command. Specifically, the REVS may be determined as follows:

$$REVS=\ln((1-CL)N)/\ln(1/(A+1))$$

Here N is the length of the data requested for a given command. N may vary from the length of a data sector (DS). An operation 212 communicates the CCT to the host and in response, the host may send and alternative data collection request. For example, the host may send an alternative data collection request that requests collecting data from a mirrored RAID 1 HDD. An operation 214 receives such alternative data collection request and an operation 216 executes the alternative data collection request to collect data using alternative HDD.

Figure 3:
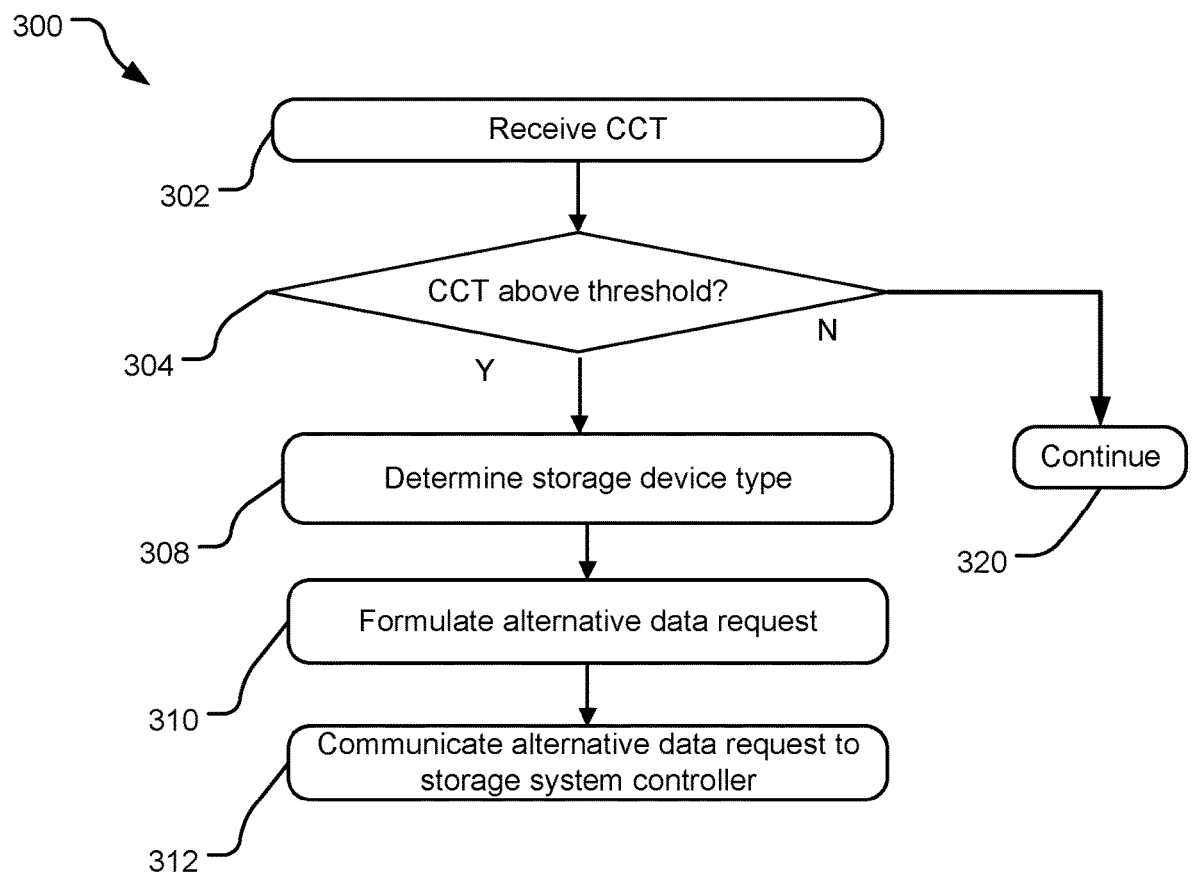
FIG. 3 illustrates example operations for formulating data request based on comparison of the CCT with various thresholds.

FIG. 3 illustrates operations 300 for formulating data request based on comparison of the CCT with various thresholds. Specifically, one or more of the operations 300 may be implemented by a storage controller of a host. An operation 302 receives the CCT calculated based on the PESs for an HDD. In response, an operation 304 compares the CCT with a threshold time to determine if it is necessary to formulate and alternative data collection request. If the CCT is not a threshold, at operation 320, the host may continue with the current data collection request. However, if the CCT is above a threshold indicating that it may take a long time to get the data, an operation 308 determines that storage device type. For example, the operation 308 may determine whether the storage device type is RAID 1, RAID 5, a cloud storage, etc.

Based on the determination of the type of the storage device, an operation 310 formulates an alternative data request. For example, if the storage device is a RAID 1 system, the operation 312 may request data from an HDD that stored mirrored data to the HDD. Alternatively, if the storage device is a RAID 5 storage, the operation 312 may request data from other two HDDs and use RAID 5 calculation to get the data.

Figure 4:
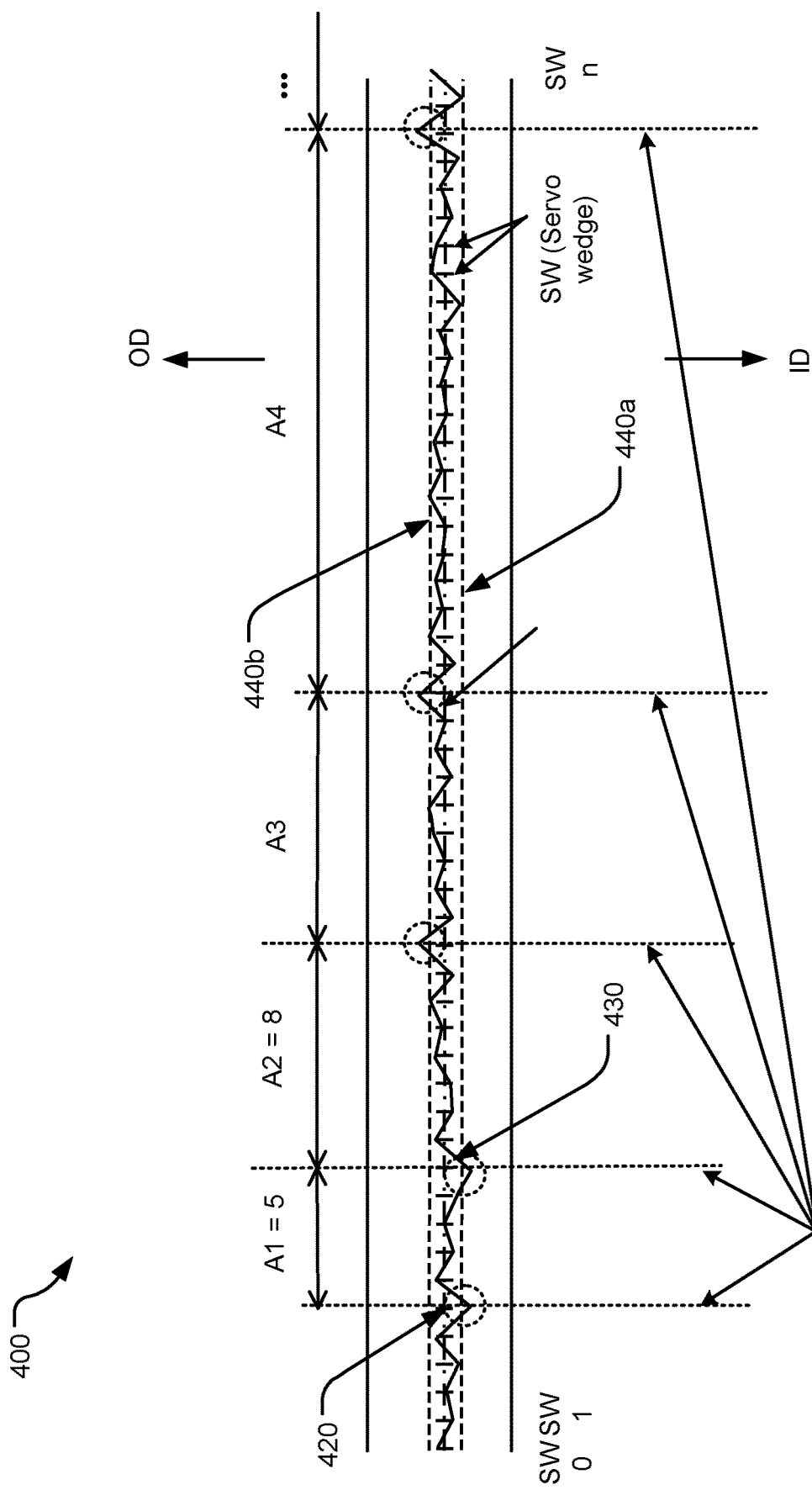
FIG. 4 illustrates an example schematic of data tracks and position error signals (PESs) of an HDD.

FIG. 4 illustrates an example schematic 400 of data tracks and position error signals (PESs) of an HDD. Specifically, FIG. 4 indicates a track 400 and various characteristics thereof. For example, the track 400 is characterized by a track center 420. A center of a reader reading data from the track 400 is referenced by 430. As shown, the reader center 430 may vary, for example, in a zigzag pattern, around the track center 420. The distance between the track center 420 and the reader center 430 is the position error signal (PES) for the track 400. Depending on the position of the reader center 430, the PES may be positive or negative. The PES may be defined as negative if the reader center 430 is in the direction of outer diameter (OD), whereas it may be defined to be positive if the reader center 430 is in the direction of the inner diameter (ID).

The UOL 440 for the track indicated by two dotted lines 440a and 440b on two sides of the track center 420. Various occurrences of the |PES|>UOL are indicated by the dotted circles and the dotted lines 450. The distance A between consecutive occurrences of the |PES|>UOL are indicated by A1-A4 starting from servo wedge 0 (SW0) in the direction of SWn. In the illustrated implementation, the number of data sectors A1 is 5, A2 is 8, etc. These values of A may be used to determine the required number of revolutions (REVS) to retrieve all the data from the track 400 in accordance with the technology disclosed herein.

Figure 5:
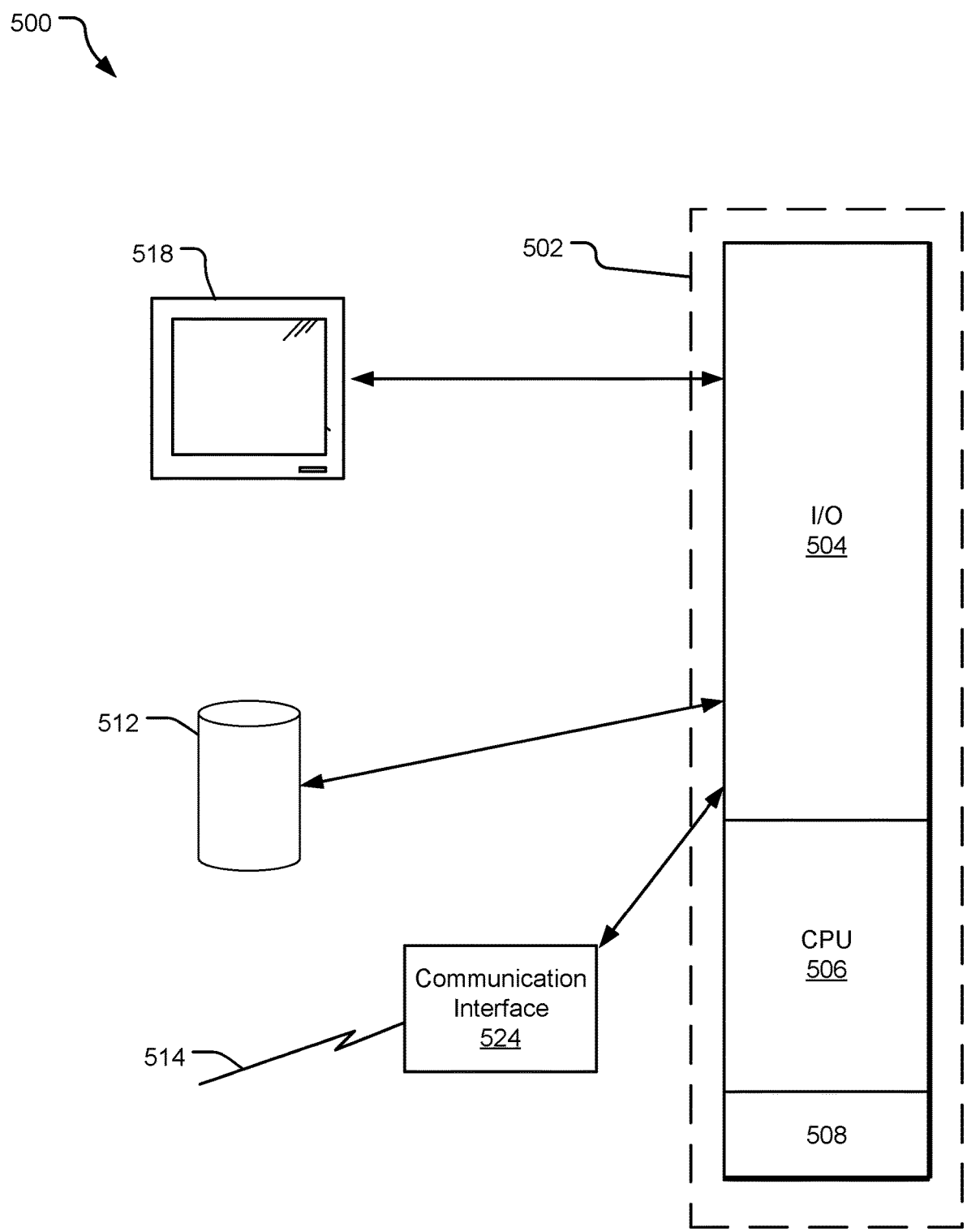
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

In an example implementation, a mobile operating system, various applications, and other modules and services may be embodied by instructions stored in memory 604 and/or storage devices 628 and processed by the processing unit 602. User preferences, service options, and other data may be stored in memory 604 and/or storage devices 628 as persistent datastores. A device validation module 650 communicatively connected with the processor 602 and the memory 604 may enable one or more of the capabilities of the system disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method, comprising:
   receiving a plurality of position error signals (PESs) for an HDD over a predetermined time period;
   determining sigma of the plurality of PESs;
   receiving upper off-track limits (UOLs) for one or more data sectors of the HDD;
   calculating average number of retrieved sectors (A) between two consecutive occurrences of the |PES|>UOL for the HDD;
   determining required number of revolutions (CCT) to collect data based on the average number of retrieved data sectors (A) and a total number of requested data sectors (N); and
   in response to determining the CCT to be above a threshold, collecting data from a mirrored HDD.

2. The method of claim 1, further comprising formulating a data request based on the determined required number of revolutions.

3. The method of claim 2, wherein formulating a data request based on the determined required number of revolutions further comprising requesting data from an alternative storage device configured to provide data redundancy to the HDD.

4. The method of claim 1, further comprising determining a probability of the PES being above the UOL based on the sigma of the plurality of PESs, wherein the average number of retrieved data sectors (A) is calculated using the probability of the PES being above the UOL based on the sigma of the plurality of PESs.

5. The method of claim 1, further comprising comparing the required CCT to the threshold and communicating the CCT to a host in response to determining that the CCT is above the threshold.

6. The method of claim 1, wherein operating the HDD to determine the UOL further comprising operating the HDD to determine the UOL during a storage device certification process.

7. The method of claim 1, further comprising requesting data from a mirrored HDD in response to determining that the CCT is above threshold.

8. The method of claim 1, further comprising requesting data from at least two alternative storage devices using calculation of RAID 5 capacity in response to determining that the CCT is above the threshold.

9. One or more processor-readable non-transitory storage media encoding processor-executable instructions for executing on a computer system a computer process, the computer process comprising:
   receiving a plurality of position error signals (PESs) for an HDD over a predetermined time period;
   determining sigma of the plurality of PESs;
   receiving upper off-track limit (UOLs) for one or more data sectors of the HDD;
   calculating average number of retrieved sectors (A) between two consecutive occurrences of the |PES|>UOL for the HDD;
   determining required number of revolutions (CCT) to collect data based on the average number of retrieved data sectors (A) and a total number of requested data sectors (N); and
   in response to determining the CCT to be above a threshold, collecting data from a mirrored HDD.

10. The one or more processor-readable non-transitory storage media of claim 9, wherein the computer process further comprising formulating a data request based on the determined required number of revolutions.

11. The one or more processor-readable non-transitory storage media of claim 9, wherein the computer process further comprising determining a probability of the PES being above the UOL based on the sigma of the plurality of PESs, wherein the average number of retrieved data sectors is calculated using the probability of the PES being above the UOL based on the sigma of the plurality of PESs.

12. The one or more processor-readable non-transitory storage media of claim 9, wherein the computer process further comprising comparing the required CCT to the threshold and communicating the CCT to a host in response to determining that the CCT is above the threshold.

13. The one or more processor-readable non-transitory storage media of claim 9, wherein operating the HDD to determine the UOL further comprising operating the HDD to determine the UOL during a storage device certification process.

14. The one or more processor-readable non-transitory storage media of claim 9, wherein the computer process further comprising requesting data from a mirrored HDD in response to determining that the CCT is above the threshold.

15. The one or more processor-readable non-transitory storage media of claim 9, wherein the computer process further comprising requesting data from at least two alternative storage devices using calculation of RAID 5 capacity in response to determining that the CCT is above the threshold.

16. In a computing environment, a method performed at least in part on at least one processor, the method comprising:
    determining sigma of a plurality of position error signals (PESs) for an HDD over a predetermined time period;
    receiving upper off-track limit (UOLs) for one or more data sectors of the HDD;
    calculating average number of retrieved sectors (A) between two consecutive occurrences of the |PES|>UOL for the HDD;
    determining required number of revolutions (CCT) to collect data based on the average number of retrieved data sectors (A) and a total number of requested data sectors (N);
    in response to determining the CCT to be above a threshold, collecting data from a mirrored HDD; and
    formulating a data request based on the determined required number of revolutions.

17. The method of claim 16, wherein formulating a data request based on the determined required number of revolutions further comprising requesting data from an alternative storage device configured to provide data redundancy to the HDD.

18. The method of claim 16, further comprising determining a probability of the PES being above the UOL based on the sigma of the plurality of PESs, wherein the average number of retrieved data sectors is calculated using the probability of the PES being above the UOL based on the sigma of the plurality of PESs.

19. The method of claim 16, further comprising comparing the required CCT to the threshold and communicating the CCT to a host in response to determining that the CCT is above the threshold.

20. The method of claim 16, wherein operating the HDD to determine the UOL further comprising operating the HDD to determine the UOL during a storage device certification process.

* * * * *